United States Patent [19]
Ozbutun et al.

[11] Patent Number: 6,081,800
[45] Date of Patent: Jun. 27, 2000

[54] CREATING BITMAPS FROM MULTI-LEVEL IDENTIFIERS

[75] Inventors: Cetin Ozbutun, San Carlos; Michael Depledge, San Jose; Hakan Jakobsson, San Francisco; Mark Kremer; Jeffrey I. Cohen, both of Sunnyvale; Quoc Tai Tran, Redwood Shores; Alexander C. Ho, Belmont, all of Calif.

[73] Assignee: Oracle Corporation, Redwood Shores, Calif.

[21] Appl. No.: 08/807,344

[22] Filed: Feb. 28, 1997

(Under 37 CFR 1.47)

[51] Int. Cl.$^7$ .................................................. G06F 17/30
[52] U.S. Cl. ..................... 707/3; 707/1; 707/8; 707/10
[58] Field of Search ................... 707/1, 8, 3, 10

[56] References Cited

U.S. PATENT DOCUMENTS

| | | | |
|---|---|---|---|
| 5,404,411 | 4/1995 | Banton et al. | 382/254 |
| 5,425,137 | 6/1995 | Mohan et al. | 345/433 |
| 5,465,322 | 11/1995 | Hsu et al. | 395/114 |
| 5,495,608 | 2/1996 | Antoshenkov | 707/3 |
| 5,537,550 | 7/1996 | Russell et al. | 395/200.11 |
| 5,634,088 | 5/1997 | Banton | 395/102 |
| 5,649,181 | 7/1997 | French et al. | 707/3 |

OTHER PUBLICATIONS

"Oracle TextServer3 Concepts, Version 3,"Oracle Corporation (Part No. A24984–1, 1995, pp. 3–1 to 3–23).

"Oracle Textserver3 Concepts, Release 3.1," Oracle Corporation (Part No. A41697–2), 1996, pp. 3–1 to 3–29.

"SQL *TextRetrieval Administrator's Guide", Version 2.0, Oracle Corporation, Rev. Jul., 1992 (Part No. 0365-20-0792).

Patrick O'Neil and Goetz Graefe, "Multi–Table Joins Through Bitmapped Join Indices", p. 10, second paragraph, SIGMOD Record, vol. 24, No. 23, Sep. 1995.

RMTP: A Reliable Milticast Transport Protocol, John Lin et al., Nov. 1996 IEEE.

Level Compression–Based Image Representation And Its Applications, Kuo–Liang Chung et al., Patern Recognition, vol. 31, No. 3, Mar. 1998.

Ringtree: A VLSI Architecture For Fast Image Generation And Processing, K. S. Eo et al. ISCAS' 88, Aug. 1988.

The i750 Video Processor: A Total Multimedia Solution, Kevin Harney et al., Communications oF The ACM, Apr. 1991.

Something Lossed, Something Gained Image Compression For PC Graphics, Lori Grunin, PC Magazine V11–No. 8, Apr. 1992.

Multispectral Image Compression Algorithms, Tassos Markas et al., 1993 IEEE, Jan. 1993.

*Primary Examiner*—Wayne Amsbury
*Assistant Examiner*—Shahid Alam
*Attorney, Agent, or Firm*—McDermott, Will & Emery

[57] ABSTRACT

A method and apparatus for generating and using bitmaps in a database system that employs multi-level identifiers is provided. The generated bitmaps include bits that correspond to the identifiers that have been assigned to existing records, as well as bits that correspond to all intervening multi-level identifiers that have not yet been assigned. Therefore, when new rows are inserted into the table associated with the bitmap, new bits do not have to be inserted into the existing bitmap. When existing rows are deleted, the bits that correspond to the deleted rows are not themselves deleted, but are simply set to a value that indicates that the corresponding row does not satisfy the criteria associated with the bitmap.

19 Claims, 5 Drawing Sheets

| TABLE 100 |
|---|
| 1  LINDA     F |
| 2  BERT      M |
| 3  JACK      M |
| 4  EDDY      M |
| 5  GREG      M |
| 6  MIKE      M |
| 7  ALICE     F |
| 8  FRED      M |
| 9  PETER     M |
| 10   RUSS    M |

FIG. 1A

| TABLE 102 | | |
|---|---|---|
| 10.1 | LINDA | F |
| 10.3 | BERT | M |
| 11.5 | JACK | M |
| 11.6 | EDDY | M |
| 11.7 | GREG | M |
| 11.8 | MIKE | M |
| 11.9 | ALICE | F |
| 12.2 | FRED | M |
| 12.3 | PETER | M |
| 12.5 | RUSS | M |

FIG. 1B

CREATING BITMAPS FROM MULTI-LEVEL IDENTIFIERS

RELATED APPLICATIONS

The present application is related to: U.S. patent application Ser. No. 08/808,584, entitled "BITMAP SEGMENTATION" now pending, filed by Cetin Ozbutun, Jeffrey I. Cohen, Hakan Jakobsson, Mark Kremer, Michael Depledge, Quoc Tai Tran, Alexander C. Ho, and Julian Hyde, on Feb. 28, 1997 the contents of which are incorporated herein by reference.

U.S. patent application Ser. No. 08/752,128, entitled "METHOD AND APPARATUS FOR PROCESSING COUNT STATEMENTS IN A DATABASE SYSTEM" U.S. Pat. No. 5,819,256, filed by Cetin Ozbutun, Michael Depledge, Hakan Jakobsson, and Jeffrey I. Cohen, on Nov. 20, 1996, the contents of which are incorporated herein by reference.

U.S. patent application Ser. No. 08/808,097, entitled "GROUP BY AND DISTINCT SORT ELIMINATION USING COST-BASED OPTIMIZATION" U.S. Pat. No. 5,822,747, filed by Jeffrey Ira Cohen, Cetin Ozbutun, Michael Depledge, and Hakan Jakobsson, on Feb. 28, 1997 the contents of which are incorporated herein by reference.

U.S. patent application Ser. No. 08/808,096, entitled "METHOD AND APPARATUS FOR USING INCOMPATIBLE TYPES OF INDEXES TO PROCESS A SINGLE QUERY" now pending, filed by Jeffrey Ira Cohen, Cetin Ozbutun, Hakan Jakobsson, and Michael Depledge, on Feb. 28,1997 the contents of which are incorporated herein by reference.

U.S. patent application Ser. No. 08/808,094, entitled "INDEX SELECTION FOR AN INDEX ACCESS PATH" now pending, filed by Hakan Jakobsson, Michael Depledge, Cetin Ozbutun, and Jeffrey I. Cohen, on Feb. 28, 1997 the contents of which are incorporated herein by reference.

U.S. patent application Ser. No. 08/807,429, entitled "QUERY PROCESSING USING COMPRESSED BITMAPS" now pending, filed by Cetin Ozbutun, Jeffry I. Cohen, Michael Depledge, Julian Hyde, Hakan Jakobsson, Mark Kremer, and Quoc Tai Tran, on Feb. 28, 1997 the contents of which are incorporated herein by reference.

U.S. patent application Ser. No. 08/807,451, entitled "BITMAPPED INDEXING WITH HIGH GRANULARITY LOCKING" now pending, filed by Michael Depledge, Jeffrey I. Cohen, Hakan Jakobsson, Mark Kremer, Cetin Ozbutun, Quoc Tai Tran, and Alexander C. Ho, on Feb. 28, 1997 the contents of which are incorporated herein by reference.

U.S. patent application Ser. No. 08/808,585, entitled "UPDATING BITMAPPED INDEXES" now pending, filed by Michael Depledge, Hakan Jakobsson, Cetin Ozbutun, Jeffrey I. Cohen, and Quoc Tai Tran, on Feb. 28, 1997 the contents of which are incorporated herein by reference.

U.S. patent application Ser. No. 08/808,560, entitled "BITMAP INDEX COMPRESSION" now pending, filed by Jeffrey I. Cohen, Michael Depledge, Hakan Jakobsson, Mark Kremer, Cetin Ozbutin, and Quoc Tai Tran, on Feb. 28,1997 the contents of which are incorporated herein by reference.

U.S. patent application Ser. No. 08/808,586, entitled "COMBINING BITMAPS WITHIN A MEMORY LIMIT" now pending, filed by Cetin Ozbutun, Jeffry I. Cohen, Michael Depledge, Julian Hyde, Hakan Jakobsson, Mark Kremer, and Quoc Tai Tran, on Feb. 28, 1997 the contents of which are incorporated herein by reference.

FIELD OF THE INVENTION

The present invention relates to database systems, and more specifically, to a method and apparatus for creating bitmaps from multi-level record identifiers.

BACKGROUND OF THE INVENTION

In the context of indexes, a bitmap is a series of bits associated with a body of records and a particular criteria. Each record in the body of records has a corresponding bit in the bitmap. Each bit in the bitmap serves as a flag to indicate whether the record that corresponds to the bit satisfies the criteria associated with the bitmap. Typically, a bitmap index contains one bitmap for each unique value stored in a particular column of a table, and each bit of a bitmap indicates whether a corresponding row of the table contains a particular value in the particular column.

For example, FIG. 1A illustrates a table 100 that contains ten rows, where each row contains a name and a gender indicator. Rows 2, 3, 4, 5, 6, 8, 9 and 10 contain male gender indictors. Rows 1 and 7 contain female gender indicators. Therefore, the bitmap of table 100 for the criteria "GENDER=MALE" would be 0111110111, where the "1"s in positions 2–6 and 8–10 indicate that the second through sixth and eighth through tenth rows satisfy the "GENDER=MALE" criteria, and the zeros in the first and seventh positions indicate that first and seventh rows in table 100 do not satisfy the "GENDER=MALE" criteria.

When a new row is added to a table, a bit must be added to every bitmap associated with the table. For example, if an eleventh row is added to table 100, then an eleventh bit would be added to the end of the bitmap 0111110111 to indicate whether the new row satisfies the "GENDER=MALE" criteria.

Appending a bit to the end of a bitmap is a relatively trivial task. However, the overhead involved in managing bitmaps becomes significant when rows are added between existing rows, or when existing rows are deleted.

For example, assume that the second row is deleted from a table containing millions of rows. The bitmaps associated with the table will have to be rewritten without the bit associated with the deleted row. Similarly, if a row is inserted between the $2^{nd}$ and $3^{rd}$ rows of a table containing a million rows, all bitmaps associated with the table will have to be rewritten with an extra bit added between the pre-existing $2^{nd}$ and $3^{rd}$ bits.

Many database systems use row numbering schemes where new rows are inserted between existing rows on a regular basis. For example, FIG. 1B illustrates a table 102 where the numbers associated with each row are composed of two values. The first value indicates the block on which the row is stored and the second value indicates the slot number of the row within that block. FIG. 1C illustrates how the rows of table 102 are stored on disk.

A "GENDER=MALE" bitmap for table 102 would be identical to the bitmap described above for table 100. However, an eleventh row added to table 102 would not necessarily fall into the eleventh position in the row numbering scheme. For example, if the data for the eleventh record is stored in slot 2 of block 10, the new row will be assigned the numeric identifier "10.2", making the new row the second row of table 102. Similarly, if the data for the eleventh record is stored in slot 4 of block 12, the row will be assigned the numeric identifier "12.4" making the row the tenth row of table 102.

The overhead that would be required to insert and delete bits within large bitmaps in response to the insertion and deletion of rows can be significant. The larger the bitmaps, the greater the amount of overhead required to maintain the bitmaps. Therefore, the use of bitmaps is largely restricted to static bodies of data. For example, databases distributed on CDROMs may use bitmaps to provide fast searching capabilities. Under these conditions, the bitmaps require no maintenance because no changes are ever made to the data associated with the bitmaps.

Based on the foregoing, it is clearly desirable to provide a technique for efficiently using bitmaps to index bodies of data that may be updated. It is further desirable to provide a technique for using bitmaps to index bodies of data that use multi-level numeric identifiers to establish an order to the records contained in the bodies of data.

SUMMARY OF THE INVENTION

A method and apparatus for generating and maintaining bitmaps for bodies of data that use multi-level identifiers is provided. The multi-level identifiers include a leading level and one or more non-leading levels.

According to one embodiment, a bitmap generation mechanism determines the number of distinct values for each non-leading level. The number of distinct combinations of non-leading level values are then determined based on the number of distinct values for each non-leading level. A bitmap is then generated that includes a bit sequence for every value of the leading level, where each bit sequence includes one bit for every distinct combination of non-leading level values.

According to one embodiment of the invention, one of the non-leading levels is used to indicate a slot number within a data block. In this embodiment, determining the number of distinct values for each non-leading level includes the step of determining the maximum number of records that can be stored within a single data block. The maximum number of records that can be stored within a single data block may be determined by reading the definition of the table associated with the bitmap, determining minimum record size based on the data types and constraints indicated in the table definition, and determining how many records that have that minimum record size could be stored within a single data block.

Mechanisms are also provided for determining the position of the bit that corresponds to a given multi-level identifier, and for determining the multi-level identifier that corresponds to the bit in any given bit position. These mechanisms are used to maintain the bitmap during insert, delete and update operations, and to use the bitmap to efficiently process queries on the associated table.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates a table in which records are identified by single numeric values;

FIG. 1B is a block diagram that illustrates a table in which rows are identified by a multi-level numeric identifier;

DETAILED DESCRIPTION OF THE PREFERRED EMBODIMENT

A method and apparatus for maintaining bitmaps is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 2:
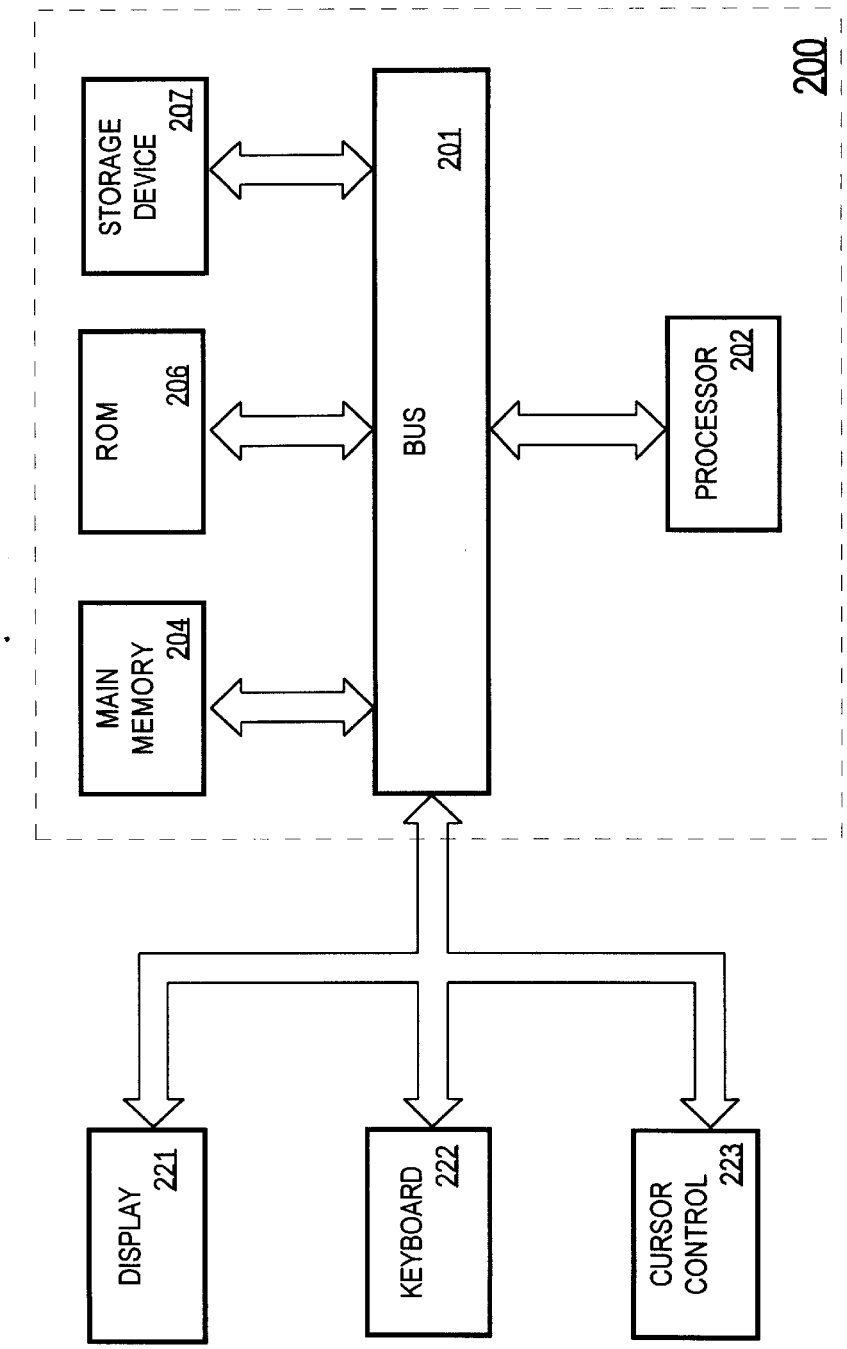
FIG. 2 is a block diagram of a computer system that may be used to implement an embodiment of the invention.

Referring to FIG. 2, it is a block diagram of a computer system 200 upon which an embodiment of the present invention can be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse,, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 to maintain bitmaps for records that are identified by multi-level numeric identifiers. According to one embodiment, bitmap maintenance is performed by computer system 200 in response to processor 202 executing sequences of instructions contained in memory 204. Such instructions may be read into memory 204 from another computer-readable medium, such as data storage device. Execution of the sequences of instructions contained in memory 204 causes processor 202 to perform the process steps that will be described hereafter. In alternative embodiments, hardwired circuitry may be used in place of or in combination with software instructions to implement the present invention. Thus, the present invention is not limited to any specific combination of hardware circuitry and software.

The techniques described hereafter allow bitmaps to be used efficiently with updatable bodies of data in which records are assigned multi-level numeric identifiers. For the purposes of explanation, it shall be assumed that the body of data associated with a bitmap is a table, and that the records stored therein are rows of the table. However, the present invention is not restricted to any particular type of data container. For example, a bitmap may be associated with a class of objects, where the individual bits in the bitmap correspond to particular instances of the object class.

Multi-Level Numeric Identifiers

Multi-level numeric identifiers consist of a series of numbers. The position of a number within the series of numbers indicates the level of the multi-level numeric identifier to which the number corresponds. For example, the identifier 10.5.6 has three levels, where "10" is at the highest level and "6" is at the lowest level. The highest level of a multi-level identifier is referred to herein as the "leading level", while the other levels are referred to as the "non-leading levels".

Figure 1C:
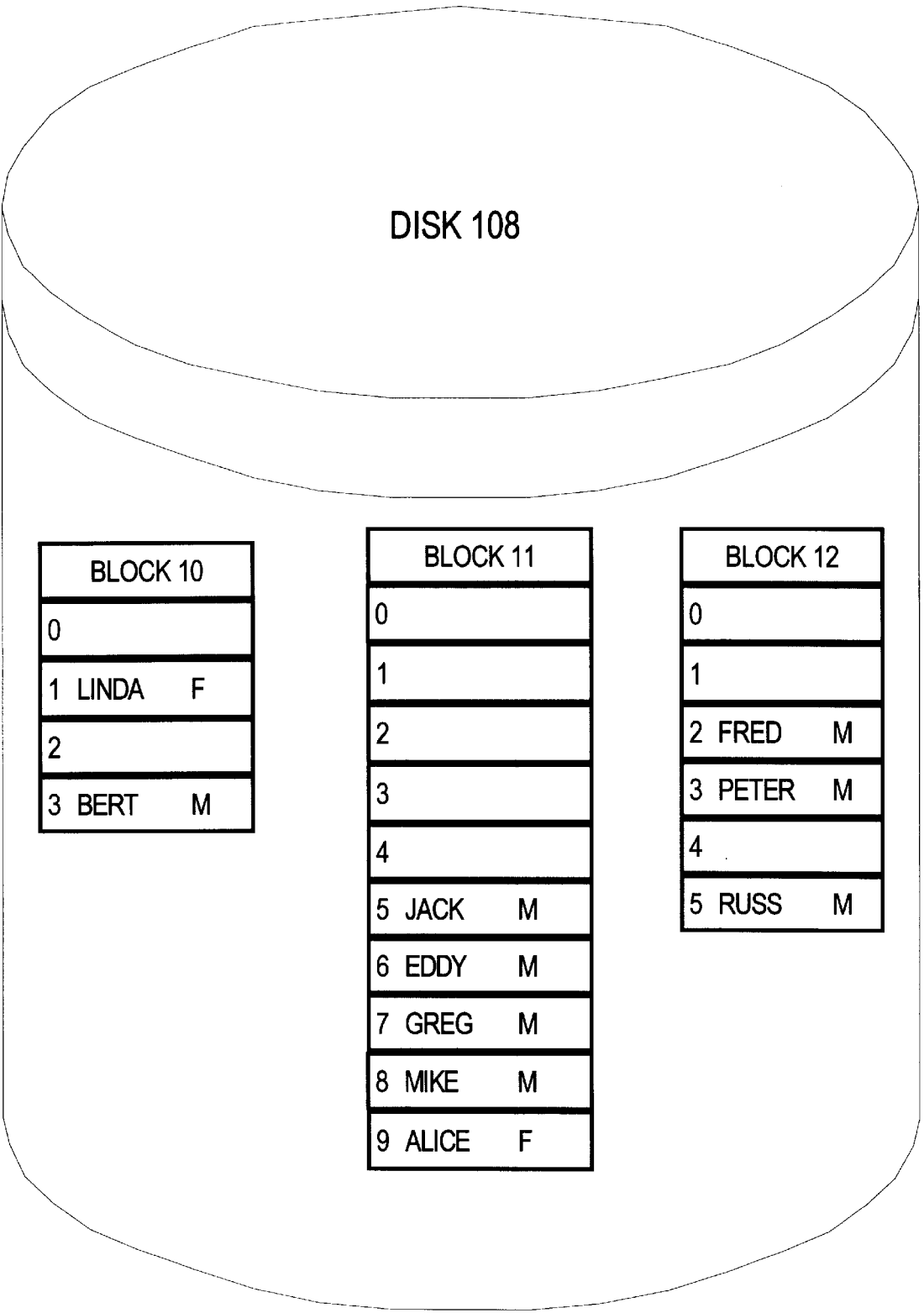
FIG. 1C is a block diagram that illustrates how the data from the table in FIG. 1B may be stored on a disk.

Typically, each level in a multi-level numeric identifier has an associated mapping in the data storage hierarchy. For example, in the numbering scheme shown in FIGS. 1B and 1C, the leading level of each row identifier is the number of the data block that contains data for the row, and the second level of the identifier is the slot number of the row within the indicated data block.

Expanded Bitmaps

According to an embodiment of the invention, a database system is provided in which "expanded bitmaps" are used to process queries. Similar to conventional bitmaps, an expanded bitmap includes bits that indicate whether the rows that correspond to the bits satisfy the criteria associated with the bitmap. These bits are referred to herein as "flag bits".

However, in addition to flag bits, expanded bitmaps include placeholder bits that do not correspond to actual rows within the table associated with the bitmap. Rather, the placeholder bits hold positions that may be used for the flag bits of later-inserted rows. Because the placeholder bits do not correspond to actual rows, the values of all placeholder bits are set to indicate that the corresponding row does not satisfy the criteria associated with the bitmap.

As shall be explained in greater detail below, an expanded bitmap contains placeholder bits that correspond to every multi-level identifier that falls between the multi-level identifiers that have already been assigned. Therefore, when a new row is inserted into the table between existing rows, a new bit does not have to be inserted into the expanded bitmaps associated with the table. Rather, the placeholder bit that corresponds to the multi-level identifier that is assigned to the new row becomes the flag bit for the new row and is set based on whether the new row satisfies the criteria associated with the bitmap. Because row insertion merely involves modifying the value of an existing bit in the expanded bitmaps rather than the insertion of a new bit, the entire expanded bitmap does not have to be rewritten when a new row is inserted.

Similarly, deleting a row does not require rewriting an entire expanded bitmap to remove one bit. Rather the bit that corresponds to the multi-level identifier of any row that is deleted simply becomes a placeholder bit. If the bit associated with a row indicates that the row satisfies the criteria associated with the expanded bitmap, then the value of the bit is changed to indicate that the row (now deleted) does not satisfy the criteria associated with the expanded bitmap.

The overhead associated with inserting bits from a bitmap is avoided as long as the expanded bitmap contains a placeholder bit associated with the identifiers assigned to new rows. Thus, the database system implementing expanded bitmaps must contain a mechanism for determining how many placeholder bits to generate, as well as a mechanism for establishing a one-to-one correspondence between bit positions and all possible multi-level row identifiers.

Generating Expanded Bitmaps

According to one embodiment of the invention, expanded bitmaps are generated by generating a series of bit sequences of length X. The number of bit sequences generated to create an expanded bitmap for a table is determined by the number of distinct values in the leading level of the multi-level row identifiers that have been assigned to rows in the table. For example, the rows in table 102 have been assigned row identifiers that begin with "10", "11" and "12". Therefore, the expanded bitmaps for table 102 would include three bit sequences.

The length X of the bit sequences is determined by multiplying the number of distinct values that can be held by all non-leading levels of the multi-level numeric identifier. Thus, if the rows in a table T are assigned a three level unique identifier A.B.C, then the length X of the bit sequences for table T is determined by multiplying the number of possible distinct values for B by the number of possible distinct values for C.

Assuming that data for up to a maximum of ten rows of table 102 can fit into a single data block, the second level of the identifier used by table 102 would be able to assume 10 distinct values. Therefore, three bit sequences that are each ten bits long are used to make expanded bitmaps for table 102.

Figure 3:
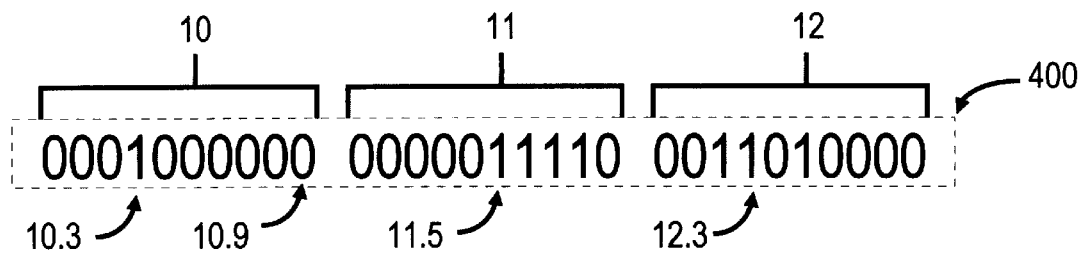
FIG. 3 is an example of an expanded bitmap for the table illustrated in FIG. 1B according to an embodiment of the invention.

FIG. 3 illustrates an expanded bitmap 400 for table 102 that is associated with the criteria "GENDER=MALE". Expanded bitmap 400 includes three bit sequences that correspond to the leading level values 10, 11 and 12. Each bit sequence includes one bit for every possible combination of non-leading level values. The identifiers used in table 102 have only one non-leading level. Because a maximum often rows can be stored in a data block, the values of the one non-leading level fall in the range of 0 to 9. Therefore, each bit sequence in expanded bitmap 400 has ten bits.

When a new row in a table is assigned an identifier with a leading level value that has not previously been used, a new bit sequence of length X is appended to the expanded bitmaps that are associated with the table. For example, if a new row for table 102 was inserted into a new block 13, the new row would be assigned an identifier that begins with 13.

The value 13 has not been used for the leading level of identifiers assigned to existing rows of table 102. Therefore, a bit sequence of ten bits would be appended to the expanded bitmaps associated with table 102.

Determining Maximum Values

According to one embodiment of the invention, the real-world meanings of the various identifier levels are used to determine the number of distinct values that can be held by each of the non-leading levels of a multi-level numeric identifier. For example, the maximum number of distinct values in the second level of the numbering scheme used for table 102 is the maximum number of rows that may be stored in a single data block.

The database system can determine the maximum number of rows that may be stored in a single data block based on information available to the database system, such as the definition of table 102 and the size of the data blocks on disk 108. The definition of table 102 will indicate the data types associated with each of the columns of table 102, and will indicate whether the columns may contain NULL values. This information may be used to determine the minimum size of any row within table 102. Once the minimum size of a row is known, the size of data blocks can be divided by the minimum size of a row to determine the maximum number of rows per data block.

For example, if each name in table 102 is represented by at least three bytes and each gender indicator in table 102 is represented by one byte, then each row will take up at least four bytes of storage. Assuming that each data block of disk 108 stores 40 bytes, then a single block will be able to store data for no more than 10 rows. Therefore, the second level of the row identifiers used by table 102 can have no more than 10 distinct values.

By determining the minimum size of a row based on the definition and constraints on a table, significant storage may be saved over alternative approaches. For example, an alternative approach may be to determine the minimum row size supported by the database system. Such a minimum size would apply to all rows of all tables. Consequently, the same bit-position-to-rowid mapping function could be applied to all tables. However, the minimum row size supported by the database may be significantly smaller (e.g. one byte) than the minimum row size of any given table. Consequently, the bitmaps in bitmap indexes associated with such tables will reserve bit positions for rowids that cannot possibly be used.

An alternative approach to determining the maximum number of slots that will be used for the rows of a given table is to allow the user to explicitly specify a minimum row size for a table. The database system would enforce the minimum row size by allocating at least that much space per row, even for rows that do not require that much space. However, this approach may waste a large amount of storage, especially if a large percentage of the rows in the table are actually smaller than the specified minimum size.

Yet another approach to determining the maximum number of slots that will be used for the rows of a given table would be to store data indicating the smallest row that has been inserted into the table. Since the smallest actual row may be larger than the smallest possible row, bitmaps based on the smallest actual row will have fewer bits that correspond to unused rowids. However, the overhead associated with monitoring the size of every inserted row, and with revising bitmaps when a new smallest row is inserted, may be significant.

Correlating Bit Positions to Identifiers

The length of expanded bitmaps is determined as described above, where every possible combination of non-leading level values has a corresponding bit. When rows are inserted, deleted and updated, the value of the bits that correspond to the rows may have to be revised. Therefore, a mechanism must be provided to determine the position of the bit that corresponds to a given identifier. In addition, when bitmaps are used to process queries, it is necessary to determine the rows associated with the flag bits that indicate that their corresponding rows satisfy a criteria specified in the query. Therefore, a mechanism must be provided to determine the identifier that corresponds to a given bit.

Determining Bit Positions from Identifiers

According to one embodiment of the invention, a position determination mechanism is provided which determines the position of the bit associated with a multi-level numeric identifier ("$L_1.L_2.L_3 \ldots L_N$") according to the equation:

$$P=(L_1-S_1)(M_2)(M_N)+L_2(M_3)(M_N)+ \ldots +L_N$$

Where:
  N is the number of levels in the multi-level numeric identifier,
  P is the position of the bit,
  $S_1$ is the starting value for the leading level,
  $L_x$ is the value for the Xth level of the identifier, and
  $M_x$ is the maximum number of distinct values for the Xth level of an identifier.

The identifiers used by Table 102 have two levels. The starting value for the leading level of Table 102 is 10 (the number of the first block used to store rows for table 102). The number of distinct values for the second level of the identifiers used for table 102 is also 10. Therefore, the position of the bit associated with the identifier 11.2 for table 102 would be determined by:

$$P=(11-10)(10)+2=12.$$

Note that this formula assumes that values for the non-leading levels begin at 0. If the values for the non-leading levels begin at 1, then 1 would be subtracted from each of the non-leading level values before applying the formula.

Determining Identifiers from Bit Positions

According to an embodiment of the invention, a mechanism for determining the multi-level identifier that corresponds to the bit in a particular bit position ("BP") of an expanded bitmap uses the formula:

$$L_1=(\text{BP DIV } A)+S_1, \text{ where } A=(M_2)(M_3) \ldots (M_N).$$

$$L_2=(\text{BP}-A(L_1-S_1)) \text{ DIV } B, \text{ where } B=((M_3)(M_4) \ldots (M_N))$$

$$L_3=(\text{BP}-(A(L_1-S_1)+B(L_2))) \text{ DIV } C, \text{ where } C=((M_4)(M_5) \ldots (M_N)).$$

For example, the multi-level identifier associated with bit number 12 in an expanded bitmap associated with table 102 would be 11.2, calculated as follows:

$$L_1=12 \text{ DIV } (10)+10=11.$$

$$L_2=(12-10(11-10)) \text{ DIV } 1=2.$$

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for generating a bitmap for a body of records, the method comprising the steps of:
   identifying a plurality of levels of multilevel identifiers used to identify records in said body of records, wherein said plurality of levels includes a leading level and one or more non-leading levels;
   determining a number of distinct values for each non-leading level of said plurality of levels;
   determining a number of distinct combinations of non-leading level values based on said number of distinct values for each non-leading level; and
   generating a bitmap that includes a bit sequence for every value of said leading level, wherein each bit sequence includes one bit for every distinct combination of said non-leading level values.

2. The method of claim 1 further comprising the steps of:
   inserting a record into said body of data;
   assigning said record a unique identifier;
   locating an existing bit in said bitmap that corresponds to said unique identifier; and
   setting the value of said existing bit based on whether said record satisfies a particular criteria associated with said bitmap.

3. The method of claim 1 wherein:
   bits of said bitmap that correspond to records that satisfy a criteria associated with the bitmap have a first value;
   bits of said bitmap that correspond to records that not satisfy said criteria associated with the bitmap have a second value;
   the method further comprises the steps of:
      deleting a record from said body of data, wherein said record had been assigned a particular identifier;
      if said record satisfied said criteria associated with said bitmap, then performing the steps of
         locating an existing bit in said bitmap that corresponds to said particular identifier; and
         setting said existing bit to said second value.

4. The method of claim 1, wherein the step of determining a number of distinct combinations of non-leading level values based on said number of distinct values for each non-leading level includes determining, for a particular non-leading level, how many records can be stored in a predetermined amount of memory.

5. The method of claim 4 wherein:
   said particular non-leading level indicates a slot number within a data block; and
   the step of determining a maximum amount of records that can be stored in the predetermined amount of memory includes the step of
      determining a maximum number of records that can be stored within a data block.

6. The method of claim 5 wherein the step of determining a maximum number of records that can be stored within a data block includes the steps of:
   reading data that defines said body of records;
   determining a minimum record size based on said data that defines said body of records; and
   determining how many records having said minimum record size can be stored within a data block.

7. The method of claim 4, wherein the step of determining, for a particular non-leading level, how many records can be stored includes:
   inspecting definition information that indicates data types of information stored in the records to determine a minimum size for said records; and
   determining a maximum amount of records that can be stored in the predetermined amount of memory based on the minimum size for said records.

8. A database system comprising:
   a body of records stored on one or more storage devices, wherein each record in said body of records is identified by a multi-level identifier that includes a leading level and one or more nonleading levels;
   a bitmap associated with said body of records, the bitmap comprising a series of bit sequences;
   wherein each distinct value of said leading level of said multi-level identifier corresponds to a distinct bit sequence in said series of bit sequences;
   wherein each bit sequence includes one bit for every possible distinct combination of non-leading level values;
   wherein bits in said bitmap that correspond to multi-level identifiers that are assigned to records that satisfy a criteria associated with said bitmap are set to a first value;
   wherein bits in said bitmap that do not correspond to multi-level identifiers that are assigned to records that satisfy said criteria associated with said bitmap are not set to said first value;
   a mechanism for identifying a bit within said bitmap that corresponds to a record based on the multi-level identifier assigned to the record; and
   a mechanism for determining the identifier of a record associated with a bit in said bitmap based on the position of said bit within said bitmap.

9. The database system of claim 8 wherein:
   each of said bit sequences has a fixed length; and
   said fixed length is determined based on the maximum number of records that can be stored in a single data block.

10. The database system of claim 9 further including:
    data that defines said body of records; and
    a mechanism for determining the maximum number of records that can be stored in said single data block based on said data that defines said body of records.

11. The database system of claim 8 further including one or more mechanisms for:
    inserting a record into said body of data;
    assigning said record a unique multi-level identifier;
    locating an existing bit in said bitmap that corresponds to said unique multi-level identifier; and
    setting the value of said existing bit based on whether said record satisfies a criteria associated with said bitmap.

12. The database system of claim 8 further including one or more mechanisms for:
    deleting a record from said body of data, wherein said record had been assigned a particular multi-level identifier;
    if said record satisfied said criteria associated with said bitmap, then performing the steps of
       locating an existing bit in said bitmap that corresponds to said particular multi-level identifier; and
       setting said existing bit to a second value.

13. A computer readable medium having stored thereon sequences of instructions for generating a bitmap for a body of records, the sequences of instructions including instructions for performing the steps of:

identifying a plurality of levels of multilevel identifiers used to identify records in said body of records, wherein said plurality of levels includes a leading level and one or more non-leading levels;

determining a number of distinct values for each non-leading level of said plurality of levels;

determining a number of distinct combinations of non-leading level values based on said number of distinct values for each non-leading level; and generating a bitmap that includes a bit sequence for every value of said leading level, wherein each bit sequence includes one bit for every distinct combination of said non-leading level values.

14. The computer readable medium of claim 13 further comprising instructions for performing the steps of:

inserting a record into said body of data;

assigning said record a unique identifier;

locating an existing bit in said bitmap that corresponds to said unique identifier; and setting the value of said existing bit based on whether said record satisfies a particular criteria associated with said bitmap.

15. The computer readable medium of claim 13 wherein:

bits of said bitmap that correspond to records that satisfy a criteria associated with the bitmap have a first value;

bits of said bitmap that correspond to records that do not satisfy said criteria associated with the bitmap have a second value;

the computer readable medium further comprises sequences of instructions for performing the steps of:

deleting a record from said body of data, wherein said record had been assigned a particular identifier;

if said record satisfied said criteria associated with said bitmap, then performing the steps of locating an existing bit in said bitmap that corresponds to said particular identifier; and setting said existing bit to said second value.

16. The computer readable medium of claim 9, wherein the step of determining a number of distinct combinations of non-leading level values based on said number of distinct values for each non-leading level includes determining, for a particular non-leading level, how many records can be stored in a predetermined amount of memory.

17. The computer readable medium of claim 16 wherein:

said particular non-leading level indicates a slot number within a data block; and the step of determining a number of distinct values for each non-leading level includes the step of determining a maximum number of records that can be stored within a data block.

18. The computer readable medium of claim 17 wherein the step of determining a maximum number of records that can be stored within a data block includes the steps of:

reading data that defines said body of records;

determining a minimum record size based on said data that defines said body of records; and determining how many records having said minimum record size can be stored within a data block.

19. The computer readable medium of claim 16, wherein the step of determining, for a particular non-leading level, how many records can be stored includes:

inspecting definition information that indicates data types of information stored in the records to determine a minimum size for said records; and determining a maximum amount of records that can be stored in the predetermined amount of memory based on the minimum size for said records.

* * * * *

UNITED STATES PATENT AND TRADEMARK OFFICE
CERTIFICATE OF CORRECTION

PATENT NO. : 6,081,800
DATED : June 27, 2000
INVENTOR(S) : Ozbutun, et al.

It is certified that error appears in the above-identified patent and that said Letters Patent is hereby corrected as shown below:

References Cited,
After the last line in the OTHER PUBLICATIONS section, please insert :

"Oracle 7.3 Focuses on Data Warehousing", by Dan Richman, September 25, 1995.

"Oracle: Oracle, HP And EMC Combines Forces To Create World's Largest Data Warehouse", by M2 Presswire, September 19, 1995.

IOUW Warp-Up. (Vendors Introduce Database Tools at International Oracle User's Week Conference), DBMS, v8, n13, p112.

"Communication", by Robert Sachs, for U.S. Application #08/807,344, entitled "Creating Bitmaps from Muti-Level Identifiers"

"Declaration of Mark Kremer", for U.S. Application #08/807,344, entitled "Creating Bit maps from Multi-Level Identifiers"

Signed and Sealed this

Fourth Day of September, 2001

*Attest:*

NICHOLAS P. GODICI
*Attesting Officer*    *Acting Director of the United States Patent and Trademark Office*